United States Patent
Karlsson

(10) Patent No.: US 8,110,053 B2
(45) Date of Patent: Feb. 7, 2012

(54) METHOD AND DEVICE FOR CUTTING A LAMINATE AND LAMINATE PRODUCT

(75) Inventor: Thomas Karlsson, Sollentuna (SE)

(73) Assignee: Otto Bock Scandinavia AB, Norrköping (SE)

(*) Notice: Subject to any disclaimer, the term of this patent is extended or adjusted under 35 U.S.C. 154(b) by 473 days.

(21) Appl. No.: 11/547,961

(22) PCT Filed: Apr. 4, 2005

(86) PCT No.: PCT/SE2005/000486
§ 371 (c)(1),
(2), (4) Date: Jun. 3, 2008

(87) PCT Pub. No.: WO2005/097474
PCT Pub. Date: Oct. 20, 2005

(65) Prior Publication Data
US 2008/0250906 A1    Oct. 16, 2008

(30) Foreign Application Priority Data
Apr. 7, 2004    (SE) .................................... 0400926

(51) Int. Cl.
*B32B 37/00* (2006.01)
(52) U.S. Cl. .................. 156/73.3; 156/73.1; 156/251
(58) Field of Classification Search ............ 156/73.1, 156/73.3, 250, 251, 267, 515, 530, 580.1, 156/580.2
See application file for complete search history.

(56) References Cited

U.S. PATENT DOCUMENTS

| 4,410,383 A * | 10/1983 | Lipari .......................... 156/73.1 |
| 4,560,427 A * | 12/1985 | Flood ........................... 156/73.3 |
| 4,610,750 A * | 9/1986 | Mango .......................... 156/510 |
| 4,623,420 A * | 11/1986 | Hinkley ........................ 156/515 |
| 4,693,771 A * | 9/1987 | Payet et al. .................. 156/73.3 |
| 4,711,693 A * | 12/1987 | Holze, Jr. .................... 156/580.1 |
| 5,061,331 A | 10/1991 | Gute ............................. 156/64 |
| 5,141,042 A * | 8/1992 | Schwaegerle ................. 160/236 |
| 6,066,226 A * | 5/2000 | Nagata et al. ................. 156/251 |
| 6,451,205 B1 | 9/2002 | McGaw, Jr. ................... 210/168 |
| 2003/0019907 A1* | 1/2003 | McGaw, Jr. ................... 228/1.1 |

FOREIGN PATENT DOCUMENTS

| EP | 0695628 A1 | 2/1996 |
| FR | 2689436 A1 | 10/1993 |
| GB | 2167707 A | 6/1986 |
| JP | 60236828 A | 11/1985 |
| JP | 06323070 A | 11/1994 |
| KR | 19990068825 A | 9/1999 |

\* cited by examiner

*Primary Examiner* — James Sells
(74) *Attorney, Agent, or Firm* — Jacobson Holman PLLC

(57) ABSTRACT

A method for cutting along a cutting line of a laminate, including a first and a second textile layer surrounding an intermediate layer of a porous elastic material. The laminate is pressed together in a local nip between an ultrasound emitting element and a counteracting element, and the laminate is moved in the cutting line through and past the nip during ultrasound cutting of the laminate simultaneous with ultrasound welding of the first and the second surface layers to each other in order to form a smooth, rounded, continuous edge joint between the surface layers at a free edge of the laminate.

9 Claims, 1 Drawing Sheet

METHOD AND DEVICE FOR CUTTING A LAMINATE AND LAMINATE PRODUCT

This is a nationalization of PCT/SE2005/00486 filed 4 Apr. 2005 and published in English.

FIELD OF THE INVENTION

The invention concerns a method and a device for cutting a laminate as well as a cut product of a laminate according to the preambles of the respective independent claims.

BACKGROUND OF THE INVENTION

Products cut out of a sheet of a laminate which includes a first and a second textile layer surrounding an intermediate layer of a porous elastic material are previously well known. According to the background art they are in general mechanically cut, whereby the resulting edge portions of the product have to be after-treated, for example by ribbon lining so that a ribbon is applied surrounding a cut edge portion of the product and is attached to a product through sewing or ultrasound welding.

Such products are in the first place, but not exclusively, bandages, orthosises and protective products for sports or for therapeutics purposes.

The drawbacks of the known products are that after-treatment through ribbon lining of the cut edge portions results in the addition of an edge ribbon and altered elasticity of the edge portion of the product. This could be detrimental for the function of the product and as an example could imply that a certain additional tightening effect will appear at the respective edge portion of for example a protection device for sports. Such a tightening effect can for example result in reduced blood circulation in the region of this edge. Besides, the after-treatment requires an extra effort of labour, which increases the cost of the product.

THE AIM AND MOST IMPORTANT FEATURES OF THE INVENTION

The aims of the present invention are to provide a method and a device as well as a product whereby the above drawbacks are avoided and wherein a totally more economic and functionally better product can be obtained.

These aims are achieved through the features of the respective independent claims.

Hereby it is possible to produce laminated products wherein the edge portion directly at the cutting operation is given a smooth, rounded, continuous edge joint between the surrounding surface layers. This is a great advantage, on the one hand because of the omission of working operations, on the other hand since it is possible to provide products, wherein the edge portions have the same elastic properties as the product as a hole, as a contrast to products where ribbons are added in these regions.

The achievement of the smooth, rounded, continuous edge joint between the surface layers are thus resulting directly from the ultrasound welding of the surface layers to each other in connection with the ultrasound emitting of the laminate in a local nip between ultrasound emitting element and counteracting element. In particular the laminate is moved in the cutting line through and passed the local nip simultaneous with ultrasound welding of the first and the second surface layers to each other. The laminate is allowed to recover in order to form a smooth, rounded, continuous edge joint between the surface layers at the free edge of the laminate being formed through the cutting process.

The ultrasound emitting element is, according to embodiments of the invention, a roller, a knife or a rail acting against a counteracting element being comprised of a metallic element such as a roller, a knife, a rail or a counteracting plate.

In general terms, what happens, is that the porous elastic material in the laminate retracts in connection with the ultrasound cutting, meaning that it melts, vaporizes, diminishes, from the nip through the action of the ultrasound treatment. This allows the textile layers, which are locally melted at the application of the ultrasound, can be welded together in the nip, whereby of course it is assumed that the textile layers are made from materials that are mutually possible to weld together.

The invention may in some applications be applied for surface layers of for example film-shaped material, but is particularly applicable and preferred for laminates, wherein the surface layers are comprised of textile layers, since the plurality of threads, which are to be heat joined, contribute to the achievement of a rounded, smooth edge portion.

It may be mentioned that it is preferred that the same material are present in both surface layers/textile layers, but it is not excluded that there are different materials which are mutually possible to weld together present on the respective side of the laminate.

As a result of the simultaneous cutting and welding, it is, surprisingly achieved, a smooth, rounded edge having covering surface layer also around the entire edge area.

It is possible to use a porous elastic material including any component which interacts and contributes to the ultrasound heat joining of the surface layers during the cutting process. This may be realized by materials, which has been melted or vaporized through the ultrasound cutting, migrates over to and is added to the region of melting and welding together of the surface layers.

Different types of textile layers can advantageously be used wherein in particular stretchable, such as knitted, materials are most preferred. Woven and non-woven textile layers are also suitable.

As examples of other particular textile materials whereto the technology can be applied can be mentioned distance tricots and distance-woven fabrics, which comprise at least two separate but interconnected layers.

In an embodiment of the method according to the invention, a laminate is used including an additional layer positioned between at least one of the two textile layers and the porous layer. Components of this material may contribute in the ultrasound welding of the textile layers in a manner corresponding to certain ultrasound weldable components being included in the porous material as is indicated above. The additional layer can be an adhesive, film, membrane, powder or textile layer or the like.

A plurality of synthetic material that can be welded can be used in the surface layers, whereby, only as examples, can be mentioned thermoplastic materials, in particular polyamide, polyester, nylon, acrylic, vinyl, polypropylene and thermoplastic urethanes.

The invention can also be applied on surface layers (textile layers) with an intermix of non-weldable materials such as natural fibres. The amount of weldable synthetic material (fibres) however, has to be high enough in order for adequate welding together to occur. Ultrasound welding of textile materials per see is previously well known, and equipment coming into question in the present invention may in principle be of a kind that is previously known, as it comes to ultrasound generator etc.

The corresponding advantages are achieved according to corresponding dependent claims, being dependent of the independent claim concerning a device for cutting and for a cut product of a laminate respectively.

BRIEF DESCRIPTION OF DRAWINGS

The invention will now be described in more detail with the aid of embodiments and with the reference to the annexed drawing, wherein:

In FIG. 1, reference numeral 1 indicates a laminate which is to be cut by a device according to the invention. A nip 2 between an ultrasound emitting element such as an ultrasound knife 3 and a counteracting plate 4 is adjusted to provide a nip width, i.e. a distance between the ultrasound knife 3 and the counteracting plate 4, which is adapted to i.a. the thickness of the laminate to be cut.

9 indicates diagrammatically a generator for ultrasound waves of a prescribed wavelength and prescribed effect.

Figure 1:
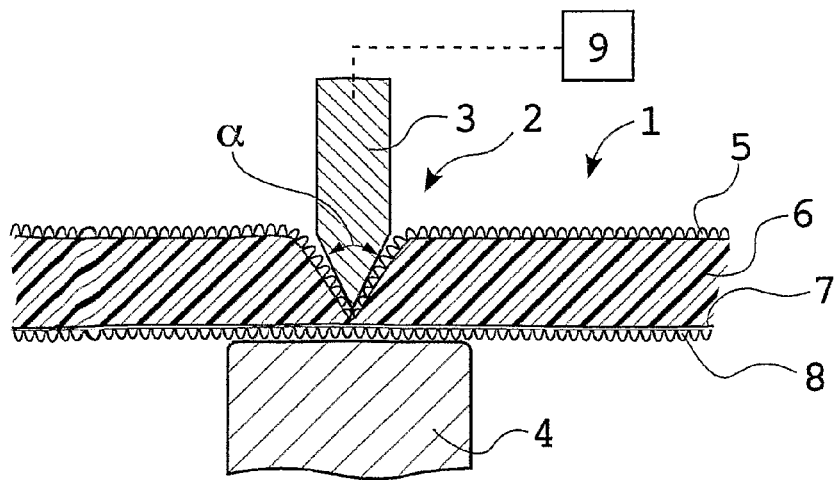
FIG. 1 diagrammatically shows a section of an apparatus for cutting a laminate according to the invention, FIG. 2 diagrammatically shows a section of the edge portion of a laminate which is cut using a method according to the invention, FIG. 3 diagrammatically shows a cut product of a laminate according to the invention.

The laminate 1 to be cut during simultaneous heat joining together of the enveloping textile layers, includes a first textile layer 5 which is laminated to an elastic, foamed material 6, which in turn at its other side comprises an additional layer 7 of a weldable material which is applied in order to give more uniform weld quality through its participation in the welding area. A second outer textile layer 8 is positioned at the outside of said additional layer 7. As seen in FIG. 1, in operation, the laminate is intended for movement perpendicular to the drawing plane.

In a method according to the invention, the laminate is moved passing the nip 3 as ultrasound waves are generated, and emitted by the ultrasound knife 3 in the direction of the counteracting plate 4. The elastic porous material 6 is brought away, is vaporized, is melted respectively, so that the outer layers 5 and 8 are squeezed together into contact with each other only via the additional layer 7. During this process, the textile layers 5 and 8 and the additional layer 7 are melted so that the pieces of a laminate are separated at the nip at the same time as a bond will be established between the first textile layer 5 and the second textile layer 8.

Figure 2:
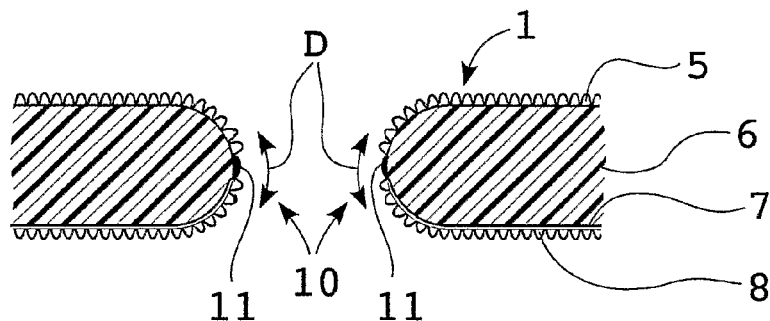

After passing the nip 2, the elastic porous material 6 will recover during exerting of a certain tension laterally as seen over the cut area. Hereby the still soft and now melted together region of the textile layers 5 and 8 will be subjected to a small tensile force in the area of the joint between the textile layers as is indicated by arrows D in FIG. 2. Hereby there an alignment and smoothening of the joint portion 11 will occur during simultaneous cooling of these areas so that the result will become a smooth rounded continuous joint.

Figure 3:
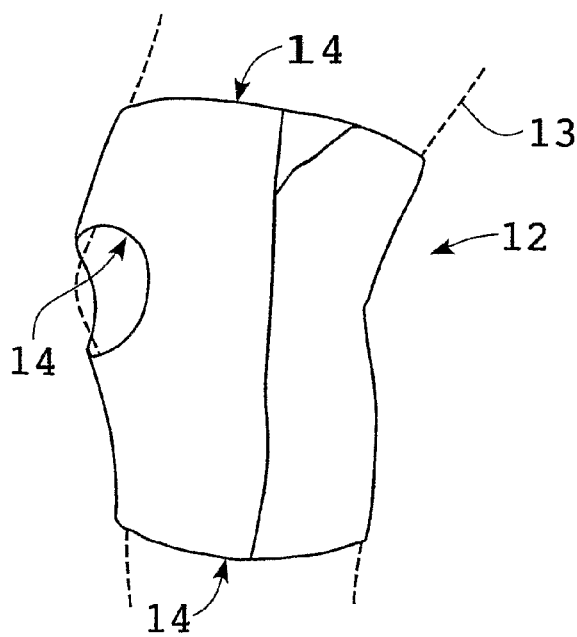

In FIG. 3 is diagrammatically shown a cut product 12 in the form of a knee protector having edge regions 14 cut through the method according to the invention. 13 indicates, with interrupted lines, the leg of a user.

Figure 4:
FIG. 4 shows a block diagram over a method according to the invention.

FIG. 4 is a flowchart over a method according to the invention wherein:

Position 15 indicates the start of the sequence.

Position 16 indicates pressing together a laminate in a local nip between an ultrasound emitting element and a counteracting element.

Position 17 indicates moving forward of the laminate along a cutting line during ultrasound cutting of the laminate simultaneous with ultrasound welding of a first and a second textile layer.

Position 18 indicates the cooling process during simultaneous gentle stretching of the textile layers that are welded together.

Position 19 indicates the end of the sequence.

The invention can be varied within the scope of the following claims, and a method according to the invention is thus highly advantageously applicable for laminates, which do not comprise any additional layer (7 in FIG. 1). In practice this is believed to be the most useful and economic application of the invention. Laminates including an additional layer also between the first textile layer 5 and the elastic porous material 6 can, however, also be contemplated.

The result of a cutting and welding process according to the invention depends on several parameters such as nip width, moving speed of the laminate through the nip, wavelength of ultrasound waves that are used as well as power output of the ultrasound generator. The latter can in general be corresponding to what is used in conventional ultrasound welding of textile layers. It could, however, be necessary to adapt it as well as also other parameters to the situation in question and to the materials of the laminate to be treated.

Different materials can be used in connection with the method according to the invention and it could be mention that the result of method according to the invention is dependent on the moving direction with respect to thread directions etc. of the different textile layers. Certain combinations of moving directions and thread directions thus give better results than other combinations.

In order to control the quality of the joint, different measures could be taken such as for example adjusting the thread directions with respect to moving directions, wherein in particular moving directions crosswise with respect of general thread directions of the textile material has proven to be particularly suitable. Parameters such as speed through the nip, nip width, dimensions of tools and tool angles such as knife or roller edge angle as well as ultrasound output power, frequency, amplitude are adjusted for adaptation to the present application. See as an example FIG. 1, where a denotes knife angle. The mechanism for feeding the laminate through the nip can be outlined in different, per se known ways. A feed roller may be serrated, toothed or the like so as to increase feed friction. Intermittently operating, non-rotating feeders may also be contemplated. It is not excluded to have manual feeding.

As is indicated, however, the provision of additional layers of suitable materials can in some applications enhance quality of the joint areas also with respect to otherwise problematical conditions with respect to the thread directions—moving directions.

Products produced according to the invention can be provided for a number of additional uses, besides the above mentioned, whereby can be mentioned hygiene products of different kinds, details of clothes, (coats, wristlets), details of furniture, car upholstery etc.

The wording "ultrasound emitting element and counteracting element" is to be understood to be interpreted broadly so as to embrace various combinations of elements forming a nip into which ultrasound energy is emitted. It does not exclude having ultrasound emitted from two sides of the nip. Neither is it intended to exclude having separate element(-s), that do(-es) not form the very nip, emitting ultrasound to the nip.

The invention claimed is:

1. A method for cutting along a cutting line of a laminate, including a first and a second surface layer surrounding an intermediate layer of a porous elastic material, wherein the laminate is pressed together between an ultrasound emitting element and a counteracting element during ultrasound cutting of the laminate simultaneous with ultrasound welding of the first and the second surface layers to each other, wherein the laminate is pressed together in a local nip between the ultrasound emitting element and the counteracting element, and wherein the laminate is moved in the cutting line through and past the local nip simultaneous with ultrasound welding of the first and the second surface layers to each other, said method comprising the step of allowing the laminate to recover during exerting of a certain tension laterally, as seen over the cut area, whereby the still soft and now melted together region of the surface layers is subjected to a small tensile force in the area of a joint between the surface layers, and whereby an alignment and smoothening of the joint portion occurs during simultaneous cooling of the cut area to form a smooth, rounded, continuous edge joint between the surface layers at a free edge of the laminate being formed through the cutting.

2. The method according to claim 1, wherein ultrasound waves are emitted from any ultrasound emitting element from the group: a roller, a knife, a rail.

3. The method according to claim 1, wherein said laminate is pressed together against a counteracting element consisting of any of the group: a metal roller, a metal knife, a metal rail, a metal plate.

4. The method according to claim 1, wherein said method is carried out on a laminate including a porous, elastic material from the group: polyurethane, EPDM, chloroprene, polyethylene or a corresponding material.

5. The method according to claim 4, wherein the porous elastic material is brought away, is melted or is vaporized from the nip during the ultrasound cutting.

6. The method according to claim 4, wherein said method is carried out on a laminate including a porous elastic material, which includes at least one ultrasound weldable component, which contributes to the ultrasound welding of the surface layers during the cutting.

7. The method according to any of claim 1, wherein said method is carried out on a laminate including textile layers as surface layers produced through knitting, distance tricot knitting, weaving, distance weaving or felting.

8. The method according to claim 1, wherein said method is carried out on a laminate including an additional layer of ultrasound cutable material which is positioned between at least one of the surface layers and the porous layer.

9. The method according to claim 1, wherein said method is carried out on surface layers of material from the group of thermoplastic materials of polyamide, polyester, nylon, acrylic, vinyl, polypropylene and thermoplastic uretanes.

* * * * *